United States Patent
Shahid

(10) Patent No.: US 11,800,370 B2
(45) Date of Patent: Oct. 24, 2023

(54) INTERFERENCE MITIGATOR

(71) Applicant: T-Mobile USA, Inc., Bellevue, WA (US)

(72) Inventor: Wafik Abdel Shahid, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 284 days.

(21) Appl. No.: 17/137,919

(22) Filed: Dec. 30, 2020

(65) Prior Publication Data
US 2022/0210660 A1   Jun. 30, 2022

(51) Int. Cl.
| | |
|---|---|
| H04W 16/14 | (2009.01) |
| H04L 25/03 | (2006.01) |
| H04W 52/36 | (2009.01) |
| H04L 1/00 | (2006.01) |
| H04W 76/27 | (2018.01) |
| H04W 92/20 | (2009.01) |

(52) U.S. Cl.
CPC ........... *H04W 16/14* (2013.01); *H04L 1/0013* (2013.01); *H04L 25/03006* (2013.01); *H04W 52/365* (2013.01); *H04W 76/27* (2018.02); *H04W 92/20* (2013.01)

(58) Field of Classification Search
CPC ... H04W 16/14; H04W 52/365; H04W 76/27; H04W 92/20; H04L 1/0013; H04L 25/03006; H04L 5/0035; H04L 5/005
See application file for complete search history.

(56) References Cited

U.S. PATENT DOCUMENTS

| | | | |
|---|---|---|---|
| 10,333,668 B2 | 6/2019 | Yoo et al. | |
| 10,812,238 B2 | 10/2020 | Zhang et al. | |
| 2014/0204853 A1* | 7/2014 | Ko | H04L 5/0048 370/329 |
| 2017/0366311 A1 | 12/2017 | Iyer et al. | |
| 2018/0049215 A1* | 2/2018 | Gheorghiu | H04L 5/0053 |
| 2018/0167848 A1 | 6/2018 | Lei et al. | |
| 2018/0324678 A1 | 11/2018 | Chen et al. | |
| 2019/0037481 A1 | 1/2019 | Zhang et al. | |
| 2019/0089498 A1* | 3/2019 | Pelletier | H04L 5/003 |
| 2022/0322130 A1* | 10/2022 | Muruganathan | H04W 16/14 |

FOREIGN PATENT DOCUMENTS

WO   WO-2022047747 A1 *   3/2022

* cited by examiner

*Primary Examiner* — Ricky Q Ngo
*Assistant Examiner* — Stephen N Steiner
(74) *Attorney, Agent, or Firm* — Han Santos, PLLC

(57) ABSTRACT

Methods, systems, and apparatus, including computer programs encoded on a computer storage medium, for implementing an interference mitigator are disclosed. In one aspect, a method includes the actions of determining, by a cellular base station, one or more first cell reference signal symbols of the cellular base station. The actions further include determining one or more second cell reference signal symbols of a neighboring cellular base station. The actions further include determining that a user equipment is communicating with the cellular base station. The actions further include providing, by the cellular base station and to the user equipment, the one or more first cell reference signal symbols and the one or more second cell reference signal symbols. The user equipment reduces interference by performing rate matching around the one or more first cell reference signal symbols and the one or more second cell reference signal symbols.

20 Claims, 4 Drawing Sheets

INTERFERENCE MITIGATOR

BACKGROUND

Dynamic Spectrum Sharing allows the deployment of both 4G LTE and 5G NR in the same frequency band and dynamically allocates spectrum resources between the two technologies based on user demand. This allows a wireless carrier to avoid dedicating spectrum to either 4G LTE or 5G NR. Instead, the carrier can share the spectrum between the two technologies.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

When user equipment is communicating with a base station that is using dynamic spectrum sharing (DSS), the base station may provide the user equipment with the location and number of the cell-specific reference signal (CRS) symbols in communication with that base station. The user equipment may receive the CRS symbols when communicating with that cell and reduce the intersymbol interference (ISI) caused when, e.g., the user equipment does not know the location of those CRS symbols within the signal frames. The ISI may be reduced by performing rate matching around the CRS symbols. However, the user equipment needs to know the location of the CRS symbols so that upon communicating with a base station of a neighboring cell (e.g., for entering the neighboring cell), the user equipment can perform the rate matching. Without that information, the user equipment may not be able to avoid interference caused by the mismatch with CRS symbols of any neighboring base stations. This interference can cause around thirty-five to forty percent throughput degradation in the user equipment transmission.

In order to reduce this interference, a base station may communicate with neighboring base stations and exchange CRS symbols. When user equipment connects with a base station that is using DSS, the base station may provide the CRS symbols of that base station and the CRS symbols of the neighboring base stations. The user equipment may then perform rate matching around the CRS symbols of the base station to which it is connected and those of the neighboring base station. The user equipment may perform the rate matching around these CRS symbols while operating in either standalone mode or non-standalone mode. By performing the rate matching around these CRS symbols, the user equipment may experience around a thirty-five to forty percent improvement in the aggregate throughput.

Figure 1:
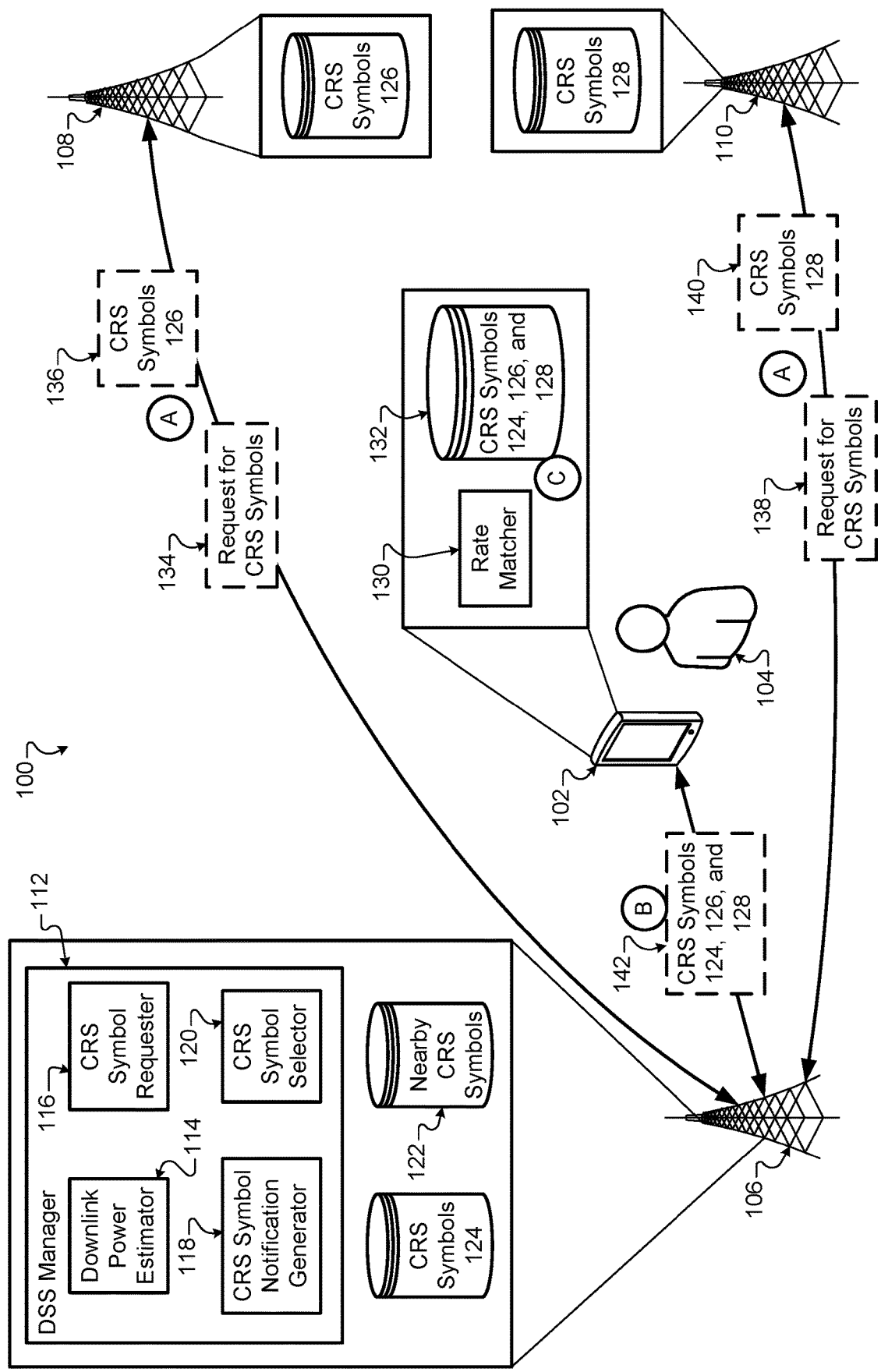
FIG. 1 illustrates an example system that is configured to transmit cell specific reference signal symbols of neighboring base stations to the user equipment for the user equipment to avoid interference when operating in dynamic spectrum sharing.

FIG. 1 illustrates an example system 100 that is configured to transmit CRS symbols of neighboring base stations to the user equipment for the user equipment to avoid interference when operating in DSS. Briefly, and as described in more detail below, the system 100 includes base stations 106, 108, and 110 that are configured to communicate using DSS. The base stations 106, 108, and 110 may exchange frames that include CRS symbols. When user equipment 102 communicates with one of the base stations 106, 108, and 110, that base station may provide the user equipment 102 with the CRS symbols of that base station and the other base stations. The user equipment 102 may then perform rate matching around the CRS symbols to avoid interference.

In more detail, the user 104 is interacting with the user equipment 102. The user equipment 102 may be any type of device that is configured to communicate with a wireless carrier network. The user equipment 102 may be a mobile phone, a tablet, a laptop computer, a smart watch, a wearable device, a desktop computer, and/or any other similar device. The wireless carrier network may include base stations 106, 108, and 110 and may provide voice and data communication services to multiple devices, such as the user equipment 102, and other devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or other similar standards.

The wireless carrier network may include a radio access network and a core network. The radio access network may include multiple base stations, such as base stations 106, 108, and 110. The multiple base stations are responsible for handling voice and/or data traffic between multiple devices, such as the user equipment 102, and other devices and the core network. Accordingly, each of the base stations 106, 108, and 110 may provide a corresponding network cell that delivers telecommunication and data communication coverage. The core network may use the network cells to provide communication services to the multiple subscriber devices. For example, the core network may connect the multiple devices to other telecommunication and data communication networks, such as the Internet and the public switched telephone network (PSTN). The base stations 106, 108, and 110 are responsible handling voice and data traffic between devices and the core network. In some implementations, the base stations 106, 108, and 110 may be in the form of eNodeB, NodeB, gNodeB, or BTS nodes. Each eNodeB, NodeB, gNodeB, or BTS node may include a base transceiver system (BTS) that communicates via an antenna system over an air-link with one or more devices that are within range. The antenna system of an eNodeB, NodeB, gNodeB, or BTS node may include multiple antennas that are mounted on a radio tower to provide a coverage area that is referred to as a "cell."

The base stations 106, 108, and 110 may be configured to communicate using both 5G-NR and LTE. One way for a base station to communicate with different user equipment using either 5G-NR or LTE would be to designate one portion of the spectrum to 5G-NR and another portion of the spectrum to LTE. While this approach may help to reduce interference between the two standards, the 5G-NR portion of the spectrum may be underutilized while users are still predominantly using devices that communicate using LTE. In order to utilize both these portions of the spectrum, a base station may be configured to use dynamic spectrum sharing (DSS). DSS allows the deployment of both LTE and 5G-NR in the same spectrum. DSS dynamically allocates spectrum resources between the two technologies based on user demand. The base station 106 may include a DSS manager 112 that is configured to implement the DSS technology.

While DSS may allow a base station to dynamically allocate spectrum as needed, there are overhead costs associated with that benefit. Even if there are LTE users connected to a base station and no 5G-NR users connected to the base station, the base station still has 5G-NR pilot channels that are active. Likewise, if there are 5G-NR users connected to a base station and no LTE users connected to the base station, the base station still has LTE pilot channels that are active. These pilot channels degrade the connection between the user equipment operating in the other mode and the base station compared to how the user equipment would operate without DSS.

In addition to this degradation inherent in DSS, the CRS symbols of the base stations 106, 108, and 110 may cause interference for the user equipment 102. To decrease the impact of this interference, the base station 106 may be configured to transmit the CRS symbols 124 to the user equipment 102 when the user equipment 102 communicates with the base station 106. By communicating the CRS symbols 124 to the user equipment 102, the rate matcher 130 of the user equipment 102 performs rate matching around those CRS symbols 124 of the base station 106.

While this arrangement helps to avoid interference related to the CRS symbols 124 of the base station 106 with which the user equipment 102 is communicating, this arrangement may not help to avoid interference related to the CRS symbols 126 and 128 of the neighboring base stations 108 and 110. The CRS symbols 126 and 128 may be seen as interference by user equipment 102, which can cause about thirty-five to forty percent degradation.

To avoid this interference, the DSS manager 112 of the base station 106 may include a CRS symbol requester 116 that is configured to request the CRS symbols from neighboring base stations 108 and 110. In stage A, the CRS symbol requester 116 may generate CRS symbol requests 134 and 138. The CRS symbol requester 116 may provide the CRS symbol request 134 to the base station 108 and the CRS symbol request 138 to the base station 110.

The base station 108 may receive the CRS symbol request 134. In response, the base station 108 may access the CRS symbols 126 of the base station 108. The base station 108 may generate the CRS symbol response 136 that includes data identifying the CRS symbols 126. The CRS symbols 126 include data identifying the location and number of CRS symbols broadcasted by the base station 108. The base station 108 transmits the CRS symbol response 136 to the base station 106.

The base station 110 may receive the CRS symbol request 138. In response, the base station 110 may access the CRS symbols 128 of the base station 110. The base station 110 may generate the CRS symbol response 140 that includes data identifying the CRS symbols 128. The CRS symbols 128 include data identifying the location and number of CRS symbols broadcasted by the base station 110. The base station 110 transmits the CRS symbol response 140 to the base station 106.

In some implementations, the base station 106 and the base station 108 may communicate over X2 to transmit the CRS symbol request 134 and the CRS symbol response 136. The base station 106 and the base station 110 may communicate over X2 to transmit the CRS symbol request 138 and the CRS symbol response 140. In some implementations, the base station 108 may request and receive the CRS symbols 124 from the base station 106 and request and receive the CRS symbols 128 from the base station 110. In some implementations, the base station 110 may request and receive the CRS symbols 124 from the base station 106 and request and receive the CRS symbols 126 from the base station 108.

The base stations 106, 108, and 110 may determine which base stations are the neighboring base stations based on one or more factors. In some instances, the neighboring base stations may be preidentified and stored in the memory of the base stations 106, 108, and 110. In some instances, the base station 106 may identify base stations 108 and 110 as neighboring base stations based on the base station 106 being able to communicate with the base stations 108 and 110. In some instances, the base station 106 may identify base stations 108 and 110 as neighboring base stations based on detecting a signal from the base station 108 or 110 that is at least a power threshold level.

The base station 106 receives the CRS symbol responses 136 and 140 that include the CRS symbols 126 and 128. The base station 106 stores the CRS symbols 126 and 128 in the nearby CRS symbols 122. The user equipment 102 is in the vicinity of the base station 106 and communicates with the base station 106. In stage B and in response to the user equipment 102 communicating with the base station 106, the CRS symbol notification generator 118 may generate the CRS symbol notification 142. The base station 106 may transmit the CRS symbol notification 142 to the user equipment 102. In some implementations, the base station 106 may transmit the CRS symbol notification 142 to the user equipment 102 using an RRC reconfiguration message.

The CRS symbol notification 142 may include the CRS symbols 124 of the base station 106 and the nearby CRS symbols 122 that includes the CRS symbols 126 and 128 from the base stations 108 and 110. The CRS symbols 124 include data identifying the location and number of CRS symbols broadcasted by the base station 106. The user equipment 102 may receive the CRS symbol notification 142 and store the CRS symbols 124, 126, and 128 in the CRS symbols storage 132.

The user equipment 102 includes a rate matcher 130. The rate matcher 130 is configured to perform rate matching around the CRS symbols in the CRS symbols storage 132. By performing rate matching around certain CRS symbols, the user equipment is able to avoid the interference caused by those CRS symbols. In stage C, the rate matcher 130 performs rate matching around the CRS symbols 124, 126, and 128 in the CRS symbols storage 132. By doing so, the user equipment can reduce the throughput degradation that is caused by the CRS symbols 124 of the base station 106 with which the user equipment 102 is communicating and the CRS symbols 126 and 128 of the neighboring base stations 108 and 110. The rate matcher 130 performs rate matching by repeating or puncturing bits on a transport block so that the number of bits in the transport block match the number of bits that can be transmitted. The rate matching may include sub-block interleaving, bit collection, and/or pruning.

The rate matcher 130 may perform rate matching around the CRS symbols 124, 126, and 128 in the CRS symbols storage 132 whether the user equipment 102 is operating in standalone mode or non-standalone mode. In non-standalone mode, the user equipment 102 enters the 5G-NR DSS cell of a base station through the LTE anchor cell of a base station. The CRS symbol notification generator 118 generates the CRS symbol notification 142, and the base station 106 provides the CRS symbol notification 142 to the user equipment 102. The CRS symbol notification 142 identifies the location and number of the CRS symbols broadcasted on the LTE cell that is dynamically sharing the spectrum with the 5G-NR cell that the user equipment 102 is attempting to add. The user equipment 102 receives the CRS symbol notification 142, and the rate matcher 130 performs rate matching around the CRS symbols 124, 126, and 128. By doing so, the user equipment 103 may avoid at least some of the interference caused by the CRS symbols 124, 126, and 128.

In standalone mode, the user equipment 102 enters the 5G-NR cell of the base station 106. The 5G-NR cell of the base station 106 is using DSS in standalone mode, and the 5G-NR cell of the base station 106 becomes the primary cell for the user equipment 102. The CRS symbol notification generator 118 generates the CRS symbol notification 142, and the base station 106 provides the CRS symbol notification 142 to the user equipment 102. The CRS symbol notification 142 identifies the location and number of the CRS symbols broadcasted on the LTE cell that is dynamically sharing the spectrum with the 5G-NR cell that the user equipment 102 is attempting to enter. The user equipment 102 receives the CRS symbol notification 142, and the rate matcher 130 performs rate matching around the CRS symbols 124, 126, and 128. By doing so, the user equipment 103 at least reduces the interference caused by the CRS symbols 124, 126, and 128.

During times when the rate matcher 130 is performing rate matching around the CRS symbols in the CRS symbols 132, the user equipment 102 may not be transmitting or receiving user data. In this case, the user equipment 102 may be using processing power and battery power to perform the rate matching. It would be preferable to avoid performing the rate matching in situations where the benefit does not offset the resources used. There may be some instances where it is unnecessary for the rate matcher 130 to perform rate matching around the CRS symbols 126 and 128. This may be the case if the density of the base stations 106, 108, and 110 is such that the base stations 108 and 110 are far enough from the user equipment 102 when the user equipment 102 is communicating with the base station 106. When the base stations 108 and 110 are far enough from the user equipment 102, the effect of the interference caused by the CRS symbols 126 and 128 may be low enough that performing rate matching around the CRS symbols 126 and 128 may not provide a benefit that is significant enough to offset the resources used to perform the rate matching around the CRS symbols 126 and 128.

The density of the base stations 106, 108, and 110 may be related to the downlink power received by the user equipment 102 as the user 104 moves around the area that includes the base stations 106, 108, and 110. A lower density of the base stations 106, 108, and 110 may cause the downlink power of the base stations 108 and 110 to differ from the downlink power of the base station 106 with which the user equipment is communicating by more than a power threshold. If the difference in the downlink powers is greater than the power threshold, then performing rate matching around the CRS symbols 126 and 128 may not provide a benefit that is significant enough to offset the resources used to perform the rate matching around the CRS symbols 126 and 128. A higher density of base stations 106, 108, and 110 may cause the downlink power of the base stations 108 and 110 to differ from the downlink power of the base station 106 with which the user equipment is communicating by less than the power threshold. If the difference in the downlink powers is less than the power threshold, then performing rate matching around the CRS symbols 126 and 128 may provide a benefit that is significant enough to offset the resources used to perform the rate matching around the CRS symbols 126 and 128. As an example, a power threshold may be ten decibels.

The base station 106 may include a downlink power estimator 114 that is configured to estimate the downlink power of the base stations 108 and 110. If the downlink power estimator 114 determines that the difference between the downlink powers of the base stations 106 and 108 is greater than a power threshold, then the downlink power estimator 114 may instruct the CRS symbol selector 120 to bypass selecting the CRS symbol 126 for the CRS symbol notification 142. If the downlink power estimator 114 determines that the difference between the downlink powers of the base stations 106 and 108 is less than the power threshold, then the downlink power estimator 114 may instruct the CRS symbol selector 120 to select the CRS symbol 126 for the CRS symbol notification 142.

Similarly, if the downlink power estimator 114 determines that the difference between the downlink powers of the base stations 106 and 110 is greater than a power threshold, then the downlink power estimator 114 may instruct the CRS symbol selector 120 to bypass selecting the CRS symbol 128 for the CRS symbol notification 142. If the downlink power estimator 114 determines that the difference between the downlink powers of the base stations 106 and 110 is less than the power threshold, then the downlink power estimator 114 may instruct the CRS symbol selector 120 to select the CRS symbol 128 for the CRS symbol notification 142.

In some implementations, the downlink power estimator 114 may be configured to use the uplink pathloss to estimate the downlink power of the base stations 106 and 108. Based on the estimated downlink power, the downlink power estimator 114 can provide instructions to the CRS symbol selector 120 regarding which CRS symbols from the nearby CRS symbols 122 to select for the CRS symbol notification 142.

In some implementations, the downlink power estimator 114 may be configured to use the power headroom report received from the user equipment 102 to determine whether user equipment 102 is operating at maximum power or within a threshold of the maximum power. An example threshold may be two decibels. If the user equipment 102 is operating at maximum power or within a threshold of the maximum power, then the downlink power estimator 114 may determine that the user equipment 102 is near enough to the base stations 108 or 110, that it would be beneficial to include the CRS symbols 126 or 128 of the base stations 108 or 110 in the CRS symbol notification 142.

The downlink power estimator 114 may continuously monitor the power headroom report received from the user equipment 102 and/or the uplink pathloss to determine whether to instruct the CRS symbol selector 120 to select any of the CRS symbols from the nearby CRS symbols 122 for inclusion in the CRS symbol notification 142. If the downlink power estimator 114 determines for the user equipment 102 to begin or cease performing rate matching around a CRS symbol, then the downlink power estimator 114 may instruct the CRS symbol selector 120 regarding which CRS symbols from the nearby CRS symbols 122 to select. The CRS symbol notification generator 118 may generate an updated CRS symbol notification 142 and transmit the updated CRS symbol notification 142 to the user equipment 102. The user equipment 102 may update the CRS symbols storage 132, and the rate matcher 130 may perform rate matching around the CRS symbols in the CRS symbols storage 132.

Figure 2:
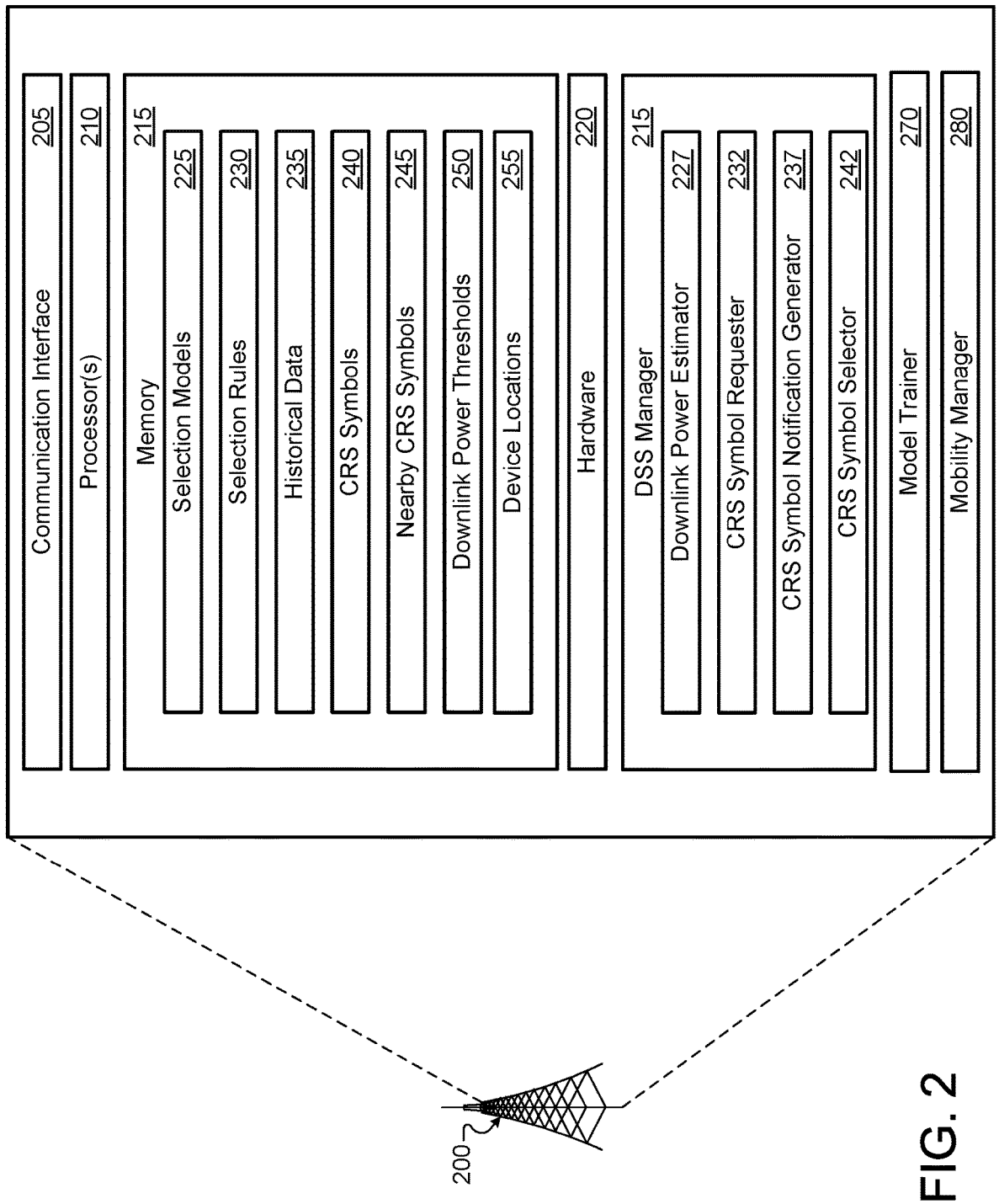
FIG. 2 illustrates an example base station that is configured to transmit cell specific reference signal symbols of neighboring base stations to the user equipment for the user equipment to avoid interference when operating in dynamic spectrum sharing.

FIG. 2 illustrates an example base station 200 that is configured to transmit cell specific reference symbols of neighboring base stations to the user equipment for the user equipment to avoid interference when operating in dynamic spectrum sharing. The base station 200 may be a cell site or cell tower that is located on a raised structure. The base station 200 and other base stations may create a cellular network that is able to provide voice and data communication services to various computing devices such as mobile phones, tablets, laptop computers, smart watches, and/or any other similar device.

The base station 200 may include a communication interface 205. The communication interface 205 may include multiple transceivers that communicate with the various computing devices. The transceivers may use various technical standards to communicate with the computing devices such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or other similar standards. The hardware 220 may include various antennas. The antennas may be directional antennas that are configured to radiate communications signals in and receive communications from a particular direction.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a DSS manager 215. The DSS manager 215 may be similar to the DSS manager 112 of FIG. 1. The DSS manager 215 may be configured to implement dynamic spectrum sharing and manage the spectrum when devices using either LTE or 5G-NR connect to the base station 200. The DSS manager 215 may include CRS symbol requester 232. The CRS symbol requester 232 may be similar to the CRS symbol requester 116 of FIG. 1. The CRS symbol requester 232 may be configured to request the CRS symbols from neighboring base stations. The CRS symbol requester 232 may generate a CRS symbol request and transmit that CRS symbol request to the neighboring base stations of the base station 200. In response, the base station 200 may receive the CRS symbols of the neighboring base stations and store the CRS symbols of the neighboring base stations in the nearby CRS symbols 245. In some implementations, the base station 200 may communicate over X2 to transmit the CRS symbol requests and the CRS symbol responses.

The DSS manager 215 may include a CRS symbol notification generator 237. The CRS symbol notification generator 237 may be similar to the CRS symbol notification generator 118 of FIG. 1. The CRS symbol notification generator 237 may be configured to generate a CRS symbol notification for transmission to the user equipment. The CRS symbol notification may include data identifying the location and number of CRS symbols broadcasted by the base station 200, which may be stored in the CRS symbols 240. The CRS symbol notification may also include data identifying the location and number of CRS symbols broadcasted by the neighboring base stations, which may be stored in the nearby CRS symbols 245. In some implementations, the CRS symbol notification generator 237 may generate a CRS symbol notification in response to the user equipment 102 connecting to the base station 200 and before the base station 200 and the user equipment 102 exchange user data.

The DSS manager 215 may include a downlink power estimator 227. The downlink power estimator 227 may be similar to the downlink power estimator 114 of FIG. 1. The downlink power estimator 227 may be configured to estimate the downlink power of the nearby base stations. If the downlink power estimator 227 determines that the difference between the downlink power of the nearby base station is greater than a downlink power threshold from the downlink power thresholds 250, then the downlink power estimator 227 may instruct the CRS symbol selector 242 to bypass selecting the nearby CRS symbols 240 of the nearby base station for the CRS symbol notification.

In some implementations, the downlink power estimator 227 may be configured to use the uplink pathloss to estimate the downlink power of the nearby base stations. Based on the estimated downlink power, the downlink power estimator 227 can provide instructions to the CRS symbol selector 242 regarding which CRS symbols from the nearby CRS symbols 240 to select for the CRS symbol notification.

In some implementations, the downlink power estimator 227 may be configured use the power headroom report received from the user equipment to determine whether user equipment is operating a maximum power or within a threshold of the maximum power. An example threshold may be two decibels. If the user equipment is operating a maximum power or within a threshold of the maximum power, then the downlink power estimator 227 may determine that the user equipment is near enough to the nearby base station that it would be beneficial to include the CRS symbols of the nearby base station in the CRS symbol notification.

The downlink power estimator 227 may continuously monitor the power headroom report received from the user equipment and/or the uplink pathloss to determine whether to instruct the CRS symbol selector 242 to select any of the CRS symbols from the nearby CRS symbols 245 for inclusion in the CRS symbol notification. If the downlink power estimator 227 determines for the user equipment to begin or cease performing rate matching around a CRS symbol, then the downlink power estimator 227 may instruct the CRS symbol selector 242 regarding which CRS symbols from the nearby CRS symbols 245 to select. The CRS symbol notification generator 237 may generate an updated CRS symbol notification and transmit the updated CRS symbol notification to the user equipment. The user equipment may perform rate matching around the CRS symbols in the updated CRS symbol notification.

In some implementations, the CRS symbol selector 242 may use the selection models 225 and/or the selection rules 230 to determine whether to include the nearby CRS symbols 245 in the CRS symbol notification. The CRS symbol selector 242 may analyze the power headroom report, the uplink pathloss, the location of the user equipment, locations of the nearby base stations, base station density, additional data received from the user equipment, and/or any other similar data using the selection models 225 and/or the selection rules 230. Based on analyzing the power headroom report, the uplink pathloss, the location of the user equipment, locations of the nearby base stations, additional data received from the user equipment, and/or any other similar data, the CRS symbol selector 240 may determine whether to include the nearby CRS symbols 245 in the CRS symbol notification.

The one or more processors 210 may implement a mobility manager 280. The mobility manager 280 may be configured to monitor the location of user equipment that is communicating with the base station 200. The mobility manager 280 may store the location data in the device locations 255 that is implemented by the memory 215.

In some implementations, the mobility manager 280 may determine the location of a user equipment at periodic intervals, such as every second. In some implementations, the user equipment may provide GPS data to the base station. In some implementations, the mobility manager 280 may determine the location of the user equipment relative to the base station 200. In this case, the mobility manager 280 may determine the relative location based on data collected from the base station such as signal strength and direction of communications between the user equipment and the base station 200. The mobility manager 280 may also determine the relative location based on the location of the base station 200 and GPS data received from the user equipment. The relative location data may include a distance between the user equipment and the base station 200, the cardinal direction from the base station 200 to the user equipment, and/or any other similar measurements.

The selection rules 230 may include one or more rules that specify how to compare the power headroom report, the uplink pathloss, the location of the user equipment, locations of the nearby base stations, base station density, additional data received from the user equipment, and/or any other similar data to determine whether to include the nearby CRS symbols 245 in the CRS symbol notification.

An example rule may specify to compare the data in the power headroom report to determine whether the user equipment is operating within two decibels of maximum power. If the user equipment is operating within two decibels of maximum power, then the rule may specify to include the nearby CRS symbols 245 in the CRS symbol notification. If the user equipment is operating outside of two decibels of maximum power, then the rule may specify to bypass including the nearby CRS symbols 245 in the CRS symbol notification. Another example rule may specify to compare the distance between the user equipment and the nearby base station. If the user equipment is within one kilometer of the nearby base station, then the rule may specify to include the nearby CRS symbols 245 in the CRS symbol notification. If the user equipment is outside of one kilometers of the nearby base station, then the rule may specify to bypass including the nearby CRS symbols 245 in the CRS symbol notification.

The selection models 225 may be configured to receive the power headroom report, the uplink pathloss, the location of the user equipment, locations of the nearby base stations, base station density, additional data received from the user equipment, and/or any other similar data and output whether to include the CRS symbols 245 in the CRS symbol notification. The selection models 225 may be trained using machine learning and historical data 235. The historical data 235 may include previous power headroom reports, previous uplink pathlosses, the previous locations of user equipment, the previous locations of the nearby base stations, previous base station density, previous additional data received from the user equipment, and/or any other similar data. In some implementations, the additional data received from the user equipment may include a battery level of the user equipment, signal strength of a signal received by the user equipment, signal strength of transmissions from the user equipment, bandwidth, and/or any other similar data.

The selection models 225 may include various models that are each configured to receive different data. For example, a selection model may be configured to receive the location of the user equipment, the base station density, and the uplink pathloss. Another selection model may be configured to receive the power headroom report, the locations of the nearby base stations, and the battery level of the user equipment. The CRS symbol selector 242 may select the model that is configured to receive the data that the CRS symbol selector 242 received. For example, if the CRS symbol selector 242 receives the location of the user equipment and the base station density, then the CRS symbol selector 242 may select a model from the selection models 225 that is configured to receive the location of the user equipment and the base station density.

The one or more processors 210 may implement a model trainer 270. The model trainer 270 may be configured to train the selection models 230 using machine learning and the historical data 235. The historical data 235 may include data collected from various user equipment and base stations. The historical data 235 may include previous power headroom reports, previous uplink pathlosses, the previous locations of user equipment, the previous locations of the nearby base stations, previous base station density, previous additional data received from the user equipment, and/or any other similar data. The historical data 235 may also include whether the nearby CRS symbols were included the CRS symbol notification. The model trainer 270 may organize the historical data 235 by generating data samples and train the selection models 225 using those data samples.

The model trainer 270 may generate the data samples by taking a snapshot of the historical data 235 for each base station. For a first base station and each user equipment connected to the first base station, the model trainer 270 may generate multiple data samples using the previous power headroom reports, previous uplink pathlosses, the previous locations of user equipment, the previous locations of the nearby base stations, previous base station density, and/or previous additional data received from the user equipment and whether the nearby CRS symbols were included the CRS symbol notification. Each data sample may represent the historical data 235 at various points in time. For a second base station and each user equipment connected to the second base station, the model trainer 270 may generate multiple data samples using the previous power headroom reports, previous uplink pathlosses, the previous locations of user equipment, the previous locations of the nearby base stations, previous base station density, and/or previous additional data received from the user equipment and whether the nearby CRS symbols were included the CRS symbol notification. Each data sample may represent the historical data 235 at various points in time.

The model trainer 270 may repeat this process for other base stations and user equipment. The model trainer 270 may train, using machine learning and the data samples, a model that is configured to receive the power headroom report, the uplink pathloss, the location of the user equipment, locations of the nearby base stations, base station density, additional data received from the user equipment, and/or any other similar data. The model may be configured to output put whether to include the CRS symbols 245 in the CRS symbol notification. In some implementations, the model trainer 270 may train different models for each base station. In this case, the selection models 225 may include models trained using data collected from the base station 200 and user equipment connected to the base station 200.

Based on analyzing the power headroom report, the uplink pathloss, the location of the user equipment, locations of the nearby base stations, base station density, additional data received from the user equipment, and/or any other similar data using the selection models 225 and/or the selection rules 230, the CRS symbol selector 242 determines whether to include the nearby CRS symbols 245 in the CRS symbol notification. The CRS symbol selector 242 provides instructions to the CRS symbol notification generator 237 regarding which of the nearby CRS symbols 245 to include in the CRS symbol notification. The CRS symbol notification generator 237 generates the CRS symbol notification that includes data identifying the location and number of the CRS symbols 240 of the base station 200 and the location and number of the selected nearby CRS symbols 245. The base station 200 provides the CRS symbol notification to the user equipment. The user equipment may perform rate matching around the CRS symbols in the CRS symbol notification to avoid interference. The CRS symbol selector 242 may continue to analyze the power headroom report, the uplink pathloss, the location of the user equipment, locations of the nearby base stations, base station density, additional data received from the user equipment, and/or any other similar data to determine whether to update the instructions for the CRS symbol notification generator 237.

Figure 3:
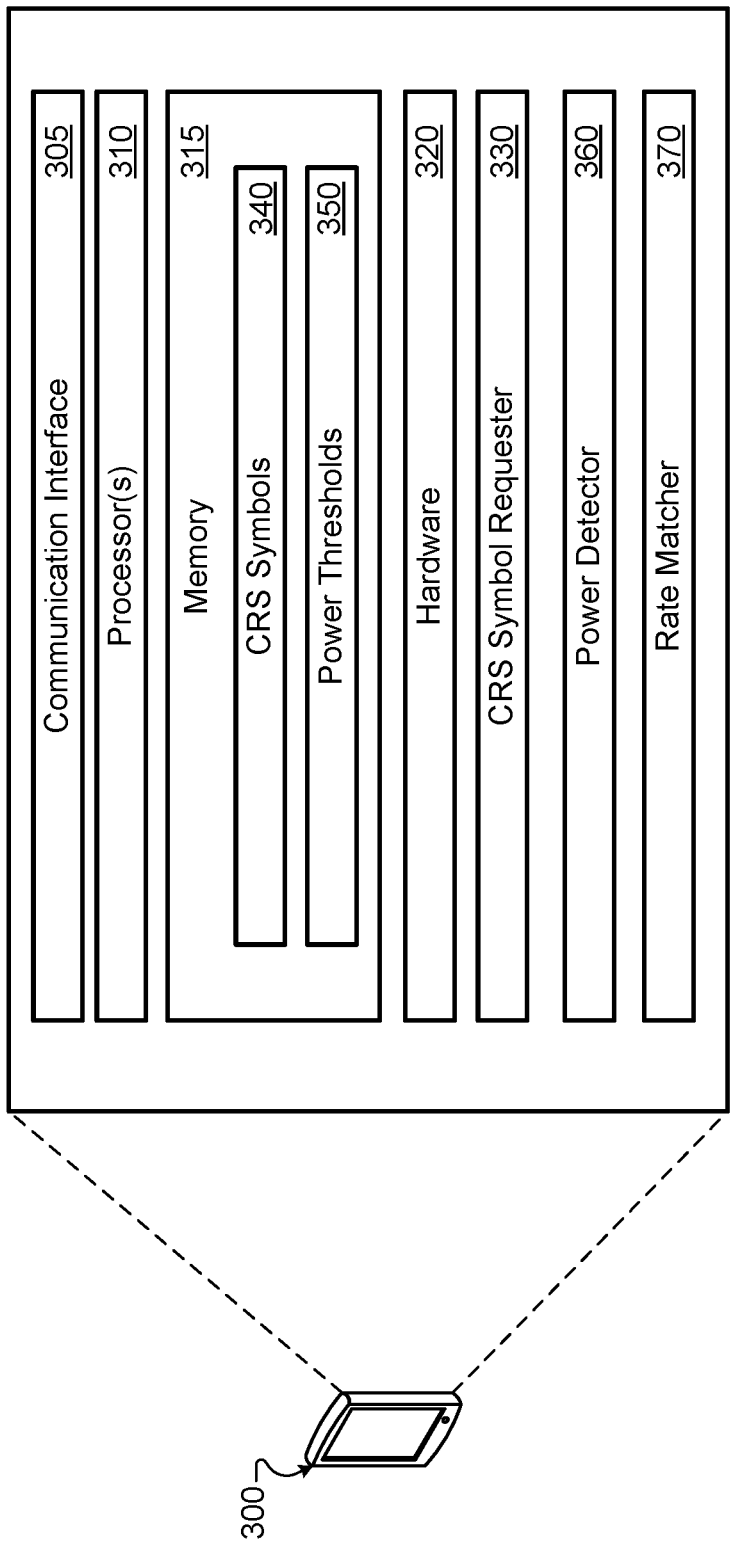
FIG. 3 illustrates an example user equipment that is configured to receive cell specific reference signal symbols to avoid interference when operating in dynamic spectrum sharing.

FIG. 3 illustrates an example user equipment 300 that is configured to receive cell-specific reference symbols to avoid interference when operating in dynamic spectrum sharing. The user equipment 300 may be any type of computing device that is configured to communicate with other computing devices. The user equipment 300 may be integrated into a wireless carrier network or interact with a wireless carrier network. The user equipment 300 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The user equipment 300 may be similar to the user equipment 102 of FIG. 1. Some of the components of the user equipment 300 may be implemented in a single computing device or distributed over multiple computing devices. Some of the components may be in the form of virtual machines or software containers that are hosted in a cloud in communication with disaggregated storage devices.

The user equipment 300 may include a communication interface 305, one or more processors 310, memory 315, and hardware 320. The communication interface 305 may include communication components that enable the user equipment 300 to transmit data and receive data from devices connected to the wireless carrier network. The communication interface 305 may include an interface that is configured to communicate with base stations of a wireless carrier network. The communication interface 305 may receive data that other devices transmit to the base stations and/or transmit data to the base stations for transmission to the other devices. In some implementations, the communication interface 305 may be configured to communicate using over a wide area network, a local area network, the internet, a wired connection, a wireless connection, and/or any other type of network or connection. The wireless connections may include Wi-Fi, short-range radio, infrared, and/or any other wireless connection.

The hardware 320 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 315 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 310 may implement a rate matcher 370. The rate matcher 370 may be similar to the rate matcher 130 of FIG. 1. The rate matcher 370 is configured to perform rate matching around the CRS symbols in the CRS symbols storage 340. By performing rate matching around certain CRS symbols, the user equipment 300 is able to avoid the interference caused by those CRS symbols. The rate matcher 370 may perform rate matching around the CRS symbols in the CRS symbols storage 340 whether the user equipment 300 is operating in standalone mode or non-standalone mode. In non-standalone mode, the user equipment 300 enters the 5G-NR DSS cell of the base station through the LTE anchor cell of the base station. The base station provides the CRS symbol notification to the user equipment 300. The CRS symbol notification identifies the location and number of the CRS symbols broadcasted on the LTE cell that is dynamically sharing the spectrum with the 5G-NR cell that the user equipment 300 is attempting to add. The user equipment 300 receives the CRS symbol notification, and the rate matcher 370 performs rate matching around the CRS symbols in the CRS symbols storage 340. By doing so, the user equipment 300 avoids the interference caused by those CRS symbols.

In standalone mode, the user equipment 300 enters the 5G-NR cell of the base station. The 5G-NR cell of the base station is using DSS in standalone mode, and the 5G-NR cell of the base station becomes the primary cell for the user equipment 300. The base station provides the CRS symbol notification to the user equipment 300. The CRS symbol notification identifies the location and number of the CRS symbols broadcasted on the LTE cell that is dynamically sharing the spectrum with the 5G-NR cell that the user equipment 300 is attempting to enter. The user equipment 300 receives the CRS symbol notification, and the rate matcher 370 performs rate matching around the CRS symbols in the CRS symbols storage 340. By doing so, the user equipment 103 avoids the interference caused by those CRS symbols.

The user equipment 300 may include a power detector 360. The one or more processors 310 may implement the power detector 360. The power detector 360 may be configured to monitor the power of signals received from the nearby base stations and the power of signals transmitted by the communication interface 305 to communicate with any of those nearby base stations. For example, the power detector 360 may detect a −70 dBm signal from a first base station and a −90 dBm signal from a second base station. The power detector 360 may also determine that the communication interface 305 transmits a signal of 18 dBm to communicate with the first base station and a signal of 22 dBm to communicate with the second base station.

The user equipment 300 may include a CRS symbol requester 330. The one or more processors 310 may implement the CRS symbol requester 330. The CRS symbol requester 330 may compare the signal powers detected to the power thresholds 350. Based on comparing the signal powers detected to the power thresholds 350, the CRS symbol requester 330 may request, from a base station, CRS symbols. The rater matcher may then perform rate matching around those CRS symbols.

In some implementations, the CRS symbol requester 330 may compare the signal powers detected to the power thresholds 350 by determining whether the power of signals received from the nearby base stations are greater than a threshold. For example, the power detector 360 may detect a −70 dBm signal from a first base station and a −90 dBm signal from a second base station. If the power threshold is −100 dBm, then the CRS symbol requester 330 may request CRS symbols for the first and second base stations. The CRS symbol requester 330 may communicate with the first base station because of the stronger signal.

As another example, the power detector 360 may detect a −70 dBm signal from a first base station and a −90 dBm signal from a second base station. If the power threshold is −80 dBm, then the CRS symbol requester 330 may request CRS symbols for the first second base station. The CRS symbol requester 330 may communicate with the first base station because of the stronger signal.

Figure 4:
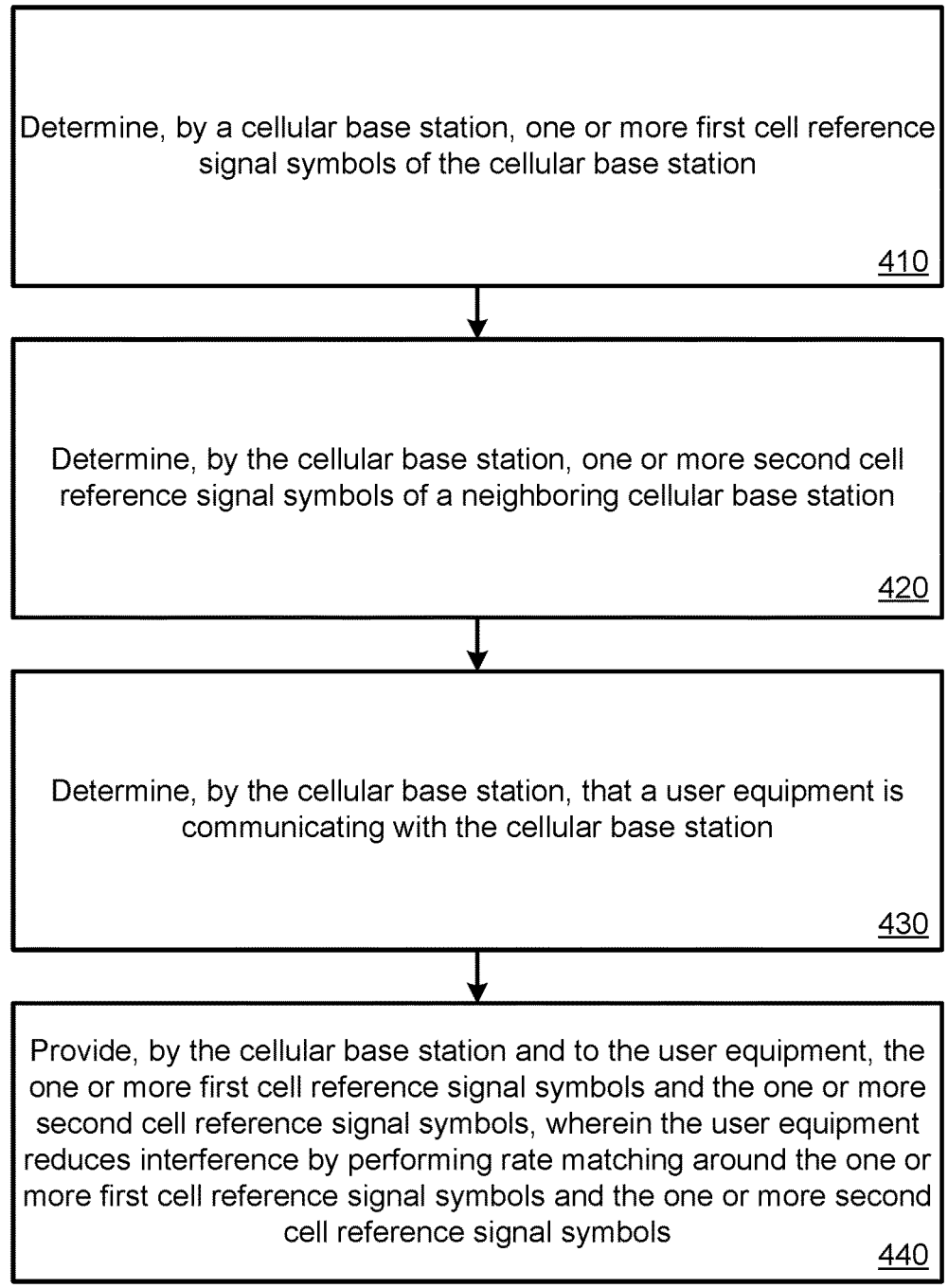
FIG. 4 is a flowchart of an example process for transmitting cell specific reference signal symbols of neighboring base stations to the user equipment for the user equipment to avoid interference when operating in dynamic spectrum sharing.

FIG. 4 is a flowchart of an example process 400 for transmitting cell specific reference symbols of neighboring base stations to the user equipment for the user equipment to avoid interference when operating in dynamic spectrum sharing. In general, the process 400 receives cell reference signal symbols of neighboring base stations. When the process 400 detects that user equipment is attempting to connect to a base station, the process 400 transmits those cell reference signal symbols to the user equipment. The user equipment may perform rate matching around those cell reference signal symbols. The process 400 will be described as being performed by the base station 106 of FIG. 1 and will include references to other components in FIG. 1. In some implementations, the process 400 may be performed by the base station 200 of FIG. 2.

The base station 106 determines one or more first cell reference signal symbols 124 of the cellular base station 106 (410). In some implementations, the base station 106 is configured to communicate with user equipment 102 using dynamic spectrum sharing. The base station 106 determines one or more second cell reference signal symbols 126 of a neighboring cellular base station 108 (420). In some implementations, the base station 106 may transmit, to the neighboring cellular base station 108, a request for the CRS symbols 126 over X2. The neighboring cellular base station 108 may receive the request and transmit the CRS symbols 126 to the base station 106 over X2. In some implementations, the one or more second cell reference signal symbols of the neighboring cellular base station 108 cause intersymbol interference in the user equipment 102.

The base station 106 determines that a user equipment is communicating with the cellular base station (430). The base station 106 and the user equipment 102 may communicate in non-standalone mode or standalone mode. The base station 106 provides, to the user equipment 102, the one or more first cell reference signal symbols 124 and the one or more second cell reference signal symbols 126, where the user equipment 102 reduces interference by performing rate matching around the one or more first cell reference signal symbols 124 and the one or more second cell reference signal symbols 126 (440). In some implementations, the base station 106 provides the user equipment 102 the one or more first CRS symbols 124 and the one or more second CRS symbols 126 before the base station 106 and the user equipment 102 exchange user data. In some implementations, the base station 106 provides the user equipment 102 the one or more first CRS symbols 124 and the one or more second CRS symbols 126 via an RRC reconfiguration message. In some implementations, the server 106 determines that the user equipment 102 is likely encountering intersymbol interference. In this case, the base station 106 provides the user equipment 102 the one or more first CRS symbols 124 based on determining that the user equipment is likely encountering intersymbol interference.

In some implementations, the base station 106 determines an estimated downlink power by determining an uplink pathloss of the user equipment 102. The base station 106 may determine to provide the one or more first CRS symbols 124 and/or the one or more second CRS symbols 126 to the user equipment 102 based on the estimated downlink power. In some implementations, the base station 106 receives a power headroom report from the user equipment 102. Based on the power headroom report, the base station 106 determines a difference between the maximum power of the user equipment 102 and the current power of the user equipment 102. The base station 106 compares the difference between the maximum power of the user equipment 102 and the current power of the user equipment 102 to a threshold. If the difference satisfies a threshold, then the base station 106 may determine to provide the one or more first CRS symbols 124 and/or the one or more second CRS symbols 126 to the user equipment 102.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed:

1. A computer-implemented method, comprising:
   determining, by a cellular base station, one or more first cell reference signal symbols of the cellular base station;
   determining, by the cellular base station, one or more second cell reference signal symbols of a neighboring cellular base station;
   determining, by the cellular base station, that a user equipment is communicating with the cellular base station;
   determining, by the cellular base station, a first downlink power of the cellular base station;
   determining, by the cellular base station, a second downlink power of the neighboring base station;
   comparing a difference between the first downlink power and the second downlink power to a downlink power threshold;
   determining that the difference between the first downlink power and the second downlink power is less than the downlink power threshold; and
   based on determining that the difference between the first downlink power and the second downlink power is less than the downlink power threshold, providing, by the cellular base station and to the user equipment, the one or more first cell reference signal symbols and the one or more second cell reference signal symbols.

2. The method of claim 1, wherein the one or more second cell reference signal symbols of the neighboring cellular base station cause intersymbol interference in the user equipment.

3. The method of claim 1, comprising:
   determining that the user equipment is encountering intersymbol interference,
   wherein providing the one or more first cell reference signal symbols or the one or more second cell reference signal symbols is based on determining that the user equipment is encountering intersymbol interference.

4. The method of claim 1, wherein the cellular base station uses dynamic spectrum sharing.

5. The method of claim 1, wherein determining the one or more second cell reference signal symbols of a neighboring cellular base station comprises:
   communicating, by the cellular base station and with the neighboring cellular base station, over X2.

6. The method of claim 1, wherein providing the one or more first cell reference signal symbols and the one or more second cell reference signal symbols comprises:
   providing the one or more first cell reference signal symbols and the one or more second cell reference signal symbols via an RRC reconfiguration message.

7. The method of claim 1, wherein the cellular base station and the user equipment communicate in non-standalone mode or standalone mode.

8. The method of claim 1, comprising:
   determining, by the cellular base station, an estimated downlink power by determining an uplink pathloss of the user equipment,
   wherein providing the one or more first cell reference signal symbols and the one or more second cell reference signal symbols is based on the estimated downlink power.

9. The method of claim 1, comprising:
   receiving, by the cellular base station and from the user equipment, a power headroom report,
   based on the power headroom report, determining, by the cellular base station difference between a maximum power of the user equipment and a current power of the user equipment;
   comparing the difference between the maximum power of the user equipment and the current power of the user equipment to a threshold power,
   wherein providing the one or more first cell reference signal symbols and the one or more second cell reference signal symbols is based on comparing the difference between the maximum power of the user equipment and the current power of the user equipment to the threshold power.

10. The method of claim 1, wherein the user equipment reduces interference by performing rate matching around the one or more first cell reference signal symbols and the one or more second cell reference signal symbols.

11. A system, comprising:
    one or more processors; and
    memory including a plurality of computer-executable components that are executable by the one or more processors to perform a plurality of actions, the plurality of actions comprising:
    determining, by a cellular base station, one or more first cell reference signal symbols of the cellular base station;
    determining, by the cellular base station, one or more second cell reference signal symbols of a neighboring cellular base station;
    determining, by the cellular base station, that a user equipment is communicating with the cellular base station;
    determining, by the cellular base station, a first downlink power of the cellular base station;
    determining, by the cellular base station, a second downlink power of the neighboring base station;
    comparing a difference between the first downlink power and the second downlink power to a downlink power threshold;
    determining that the difference between the first downlink power and the second downlink power is less than the downlink power threshold; and
    based on determining that the difference between the first downlink power and the second downlink power is less than the downlink power threshold, providing, by the cellular base station and to the user equipment, the one or more first cell reference signal symbols and the one or more second cell reference signal symbols.

12. The system of claim 11, wherein the one or more second cell reference signal symbols of the neighboring cellular base station cause intersymbol interference in the user equipment.

13. The system of claim 11, wherein the actions comprise:
    determining that the user equipment is encountering intersymbol interference,
    wherein providing the one or more first cell reference signal symbols or the one or more second cell reference signal symbols is based on determining that the user equipment is encountering intersymbol interference.

14. The system of claim 11, wherein the cellular base station uses dynamic spectrum sharing.

15. The system of claim 11, wherein determining the one or more second cell reference signal symbols of a neighboring cellular base station comprises:
communicating, by the cellular base station and with the neighboring cellular base station, over X2.

16. The system of claim 11, wherein providing the one or more first cell reference signal symbols and the one or more second cell reference signal symbols comprises:
providing the one or more first cell reference signal symbols and the one or more second cell reference signal symbols via an RRC reconfiguration message.

17. The system of claim 11, wherein the actions comprise:
determining, by the cellular base station, an estimated downlink power by determining an uplink pathloss of the user equipment,
wherein providing the one or more first cell reference signal symbols and the one or more second cell reference signal symbols is based on the estimated downlink power.

18. The system of claim 11, wherein the actions comprise:
receiving, by the cellular base station and from the user equipment, a power headroom report;
based on the power headroom report, determining, by the cellular base station difference between a maximum power of the user equipment and a current power of the user equipment;
comparing the difference between the maximum power of the user equipment and the current power of the user equipment to a threshold power,
wherein providing the one or more first cell reference signal symbols and the one or more second cell reference signal symbols is based on comparing the difference between the maximum power of the user equipment and the current power of the user equipment to the threshold power.

19. The system of claim 11, wherein the user equipment reduces interference by performing rate matching around the one or more first cell reference signal symbols and the one or more second cell reference signal symbols.

20. One or more non-transitory computer-readable media of a computing device storing computer-executable instructions that upon execution cause one or more computers to perform acts comprising:
determining, by a cellular base station, one or more first cell reference signal symbols of the cellular base station;
determining, by the cellular base station, one or more second cell reference signal symbols of a neighboring cellular base station;
determining, by the cellular base station, that a user equipment is communicating with the cellular base station;
determining, by the cellular base station, a first downlink power of the cellular base station;
determining, by the cellular base station, a second downlink power of the neighboring base station;
comparing a difference between the first downlink power and the second downlink power to a downlink power threshold;
determining that the difference between the first downlink power and the second downlink power is less than the downlink power threshold; and
based on determining that the difference between the first downlink power and the second downlink power is less than the downlink power threshold, providing, by the cellular base station and to the user equipment, the one or more first cell reference signal symbols and the one or more second cell reference signal symbols.

* * * * *